United States Patent [19]

Cook et al.

[11] 3,843,798

[45] Oct. 22, 1974

[54] METHODS AND COMPOSITIONS FOR INDUCING RESISTANCE TO BACTERIAL INFECTIONS

[75] Inventors: Elton S. Cook; Akira Fujii, both of Cincinnati, Ohio

[73] Assignee: Stanley Drug Products, Inc., Portland, Oreg.

[22] Filed: Mar. 12, 1973

[21] Appl. No.: 340,386

[52] U.S. Cl. .............................................. 424/319
[51] Int. Cl. ............................................ A61k 27/00
[58] Field of Search ................................... 424/319

[56] References Cited
OTHER PUBLICATIONS
Chemical Abstracts, 62:15254h – 15255a, (1965).

Primary Examiner—Jerome D. Goldberg
Attorney, Agent, or Firm—John G. Schenk

[57] ABSTRACT

A variety of substances are reported which alter host resistance to cocci and bacilli bacterial infections. Nevertheless, because of the extreme difficulty of total eradication, and the frequent reappearance of the same strains, even after their apparently successful elimination, there is a continuing need for drugs for the treatment of coccic infections. Certain guanidino acids have been found effective in inducing resistance to infections due to cocci and bacilli.

6 Claims, No Drawings

METHODS AND COMPOSITIONS FOR INDUCING RESISTANCE TO BACTERIAL INFECTIONS

BACKGROUND OF THE INVENTION

This invention pertains to antimicrobials. In a particular aspect this invention relates to antimicrobials effective in protecting against cocci and bacilli bacterial infections.

Bacteria such as cocci and bacilli area unique group of organisms embodying within themselves an array of yet unanswered puzzles in biology, both fundamental and experimental. It is recognized that the significance of staphyolococcal infections is not so much in severity, except in a few instances, as in the subleties of the infection due to the unpredictable vagaries of these organisms. The result is the disease continues to be a problem.

Treatment of staphylococcal diseases is complicated by the ability of the organisms to develop resistance. The magnitude of the problem is further amplified by the extreme difficulty of total eradication, and the frequent reappearance of the same strain even after apparently successful elimination. The inability to eliminate the carrier state by any of the currently known methods and the prevalence of the new antibiotic resistant hospital strains have added a new dimension to the frustrating situation.

Penicillin G (benzyl penicillin) is still the drug of choice for the treatment of infections caused by susceptible coccic strains. However, numerous strains are known which elaborate an enzyme penicillinase in response to the drug and thus remain insensitive. This led to the development of semisynthetic penicillins which are not inactivated by penicillinase, and resistance of staphylococci to these newer penicillins has been reported. However, there is a seemingly never ending demand for anticoccic agents.

A variety of substances are reported which alter host resistance to coccic infections. However, because of the ubiquitous nature of cocci and bacilli, and the diversification of their biological and biochemical characteristics, there is a continuing need for drugs for the treatment of these infections. The existence of multiple antibiotic-resistant strains of the organism suggests the desirability of continuous investigation of drugs for combating the infection. This invention provides an antimicrobial for the treatment of staphylococci and bacillic infections.

SUMMARY OF THE INVENTION

In accordance with this invention it has been found that selected omega-guanidino acids afford desirable degrees of protection against cocci and bacilli infections. In fact these omega-guanidino acids possess an anticoccic activity superior to that of the corresponding omega-amino acids.

DETAILED DESCRIPTION OF THE INVENTION

The processes of infection leading to disease are accepted to be a problem in the ecology of the parasite. It is being increasingly realized that the bacterial and host determinants are closely interrelated. Staphylococcal virulence derives from the combined action of several bacterial factors whose effectiveness is conditioned by the reactions of the host. Perhaps the most striking feature of host-parasite relationships in staphylococcal infections is the relatively atypical immunologic response. For this reason additional antimicrobials are always in demand.

By the practice of this invention there is provided an additional method of protecting mammals against bacterial infections. In accordance with the invention an antibacterial amount of certain omega-guanidino acids is administered to mammals in need of an antimicrobial effective in protecting against cocci and bacilli. These acids, administered for the inhibition of bacterial growth, are compounds having the formula, (A) $H_2N-C(=NH)-NH-(CH_2)_N-COOH$ where $n$ is an integer of 1 through 5, i.e., a whole number less than six. Included are guanidinoacetic acid, beta-guanidinopropionic acid, gamma-guanidinobutyric acid, delta-guanidinovaleric acid, and epsilon-guanidinohexanoic acid.

The antistaphyloccocal activities of the omega-guanidino acids will be apparent from the following test results. It has been found that amino acids disappear from the blood stream within 6 hours after their subcutaneous administration. Consequently in the technique employed herein a total of 5 mg. of each drug was given subcutaneously in equally divided doses 2 hours before and 4 hours after the injection of *Staphylococcus aureus*.

The strain of *S. aureus* used in the present investigations and termed "original" strain was isolated from an infected tonsil and has been maintained in our laboratory in the lyophilized state. It is penicillin-resistant, is highly chromogenic, ferments a number of sugars, includng mannitol, mannose, maltose, lactose, galactose, glucose, and fructose, and produces coagulase, catalase, gelatinase, deoxyribonuclease, phosphatase, urease, and alpha-toxin.

Culture conditions were standardized, and the third subculture from the lyophilized mother culture was used. The subcultures were grown at 37° for 24 hours on Staphylococcus Medium 110 (Difco). The organisms from the third subculture were twice washed and suspended in TC Tyrode Solution (Difco), and the concentration was adjusted turbidimetrically, with a nephelometer, for injection into animals. The transmission levels on the scale of the instrument were taken as a measure reference of the density of the suspensions and were correlated with viable bacterial counts. Animals were inoculated subcutaneously with 0.5 ml. of a suspension having 70 percent transmission or $2 \times 10^8$ organisms by count. This dosage was approximately 1.5 times the $LD_{50}$.

Swiss albino female mice maintained on the Rockland diet, ranging in age from 8 to 10 weeks old and in weight from 20 to 25 grams were used in all experiments. All mice were randomized for individual experiments. These mice were propagated in our laboratory from stock originally obtained from Texas Inbred Mice Co., Houston, Texas.

The antistaphylococcal effects of the omega-guanidino acids will now be given in tabular form. In the table the compound number is the value of n in formula A given hereinbefore. Gamma-aminobutryl-L-histidine was the control. Percent protection is (mortality control — mortality treated) × 100/(mortality conrol) on the fourth day after infection with *S. aureus*.

| Antistaphylococcal Activity of Omega-Guanidino Acids | | |
| --- | --- | --- |
| Compound | No. of Animals | Percent Protection |
| 1 | 32 | 50 |
| 2 | 32 | 32 |
| 3 | 32 | 44 |
| 4 | 30 | 66 |
| 5 | 32 | 57 |
| ABA-His | 32 | 65 |

The desirable antistaphylococcal activities of the omega-guanidino acids described herein are apparent from the table. Guanidinoacetic acid provided unexpectedly high protection. However, delta-guanidinovaleric acid was the best antistaphyloccal agent among the guanidino acids. Moreover, as can be seen from the following all of the omega-guanidino acids were more potent than the corresponding omega-amino acids.

| Comparisons of Guanidino with Amino Acids | |
| --- | --- |
| Compound | Percent Protection on 4th Day Mean |
| Glycine | 12 |
| guanidinoacetic acid | 50 |
| Beta-Alanine | 13 |
| guanidinopropionic acid | 32 |
| Gaba | 33 |
| guanidinobutyric acid | 44 |
| Dava | 54 |
| guanidinovaleric acid | 66 |
| Eaha | 36 |
| guanidinohexanoic acid | 57 |

Gaba, gamma-aminobutyric acid; Dava, delta-aminovaleric acid; Eaha, epsilon-aminohexanoic acid.

The $n=1$, $n=2$, and $n=3$ acids which are employed herein were commercially available. The $n=4$ and $n=5$ acids were prepared as follows:

EXAMPLE A

Delta-Guanidinovaleric acid ($n=4$) — To a soln of S-ethylisothiourea·H$_2$SO$_4$ (19 g.) dissolved in 25 ml. of 2 N NaOH was added 6 g. of delta-aminovaleric acid dissolved in 10 ml. of H$_2$O under ice cooling and vigorous stirring. The mixture stood for 5 hrs. in the ice bath and was kept overnight at room temp. The turbid soln was filtered and acidified (pH 4.0) with conc HCl. Abs EtOH was added to the soln and the ppt of NaCl was filtered off. The filtrate was concentrated and subjected to ion-exchange chromatography, using a 2.0 × 40 cm column of Amberlite CG-120, 200–400 mesh, pyridine form. As eluents, first 500 ml of H$_2$O and then 0.1 M pyridine were used. The elution of the compound was followed by the Sakaguchi reaction. Its peak quantity appeared in the effluent at approx 1800 ml. The fractions, 1,600–2,100 ml, were pooled and concd in vacuo. The dry residue was treated with H$_2$O-EtOH-Et$_2$O to produce crystals: yield, 28.0 percent; mp, 267°–271°; Anal. ($C_6H_{13}N_3O_2$) C,H,N. Ir peaks (cm$^{-1}$) were 632, 716, 828, 934, 981, 1094, 1151.

EXAMPLE B

Epsilon-Guanidinohexanoic acid ($n=5$) — S-Ethylisothiourea·H$_2$SO$_4$ (10 g) and 6.5 g of epsilon-aminohexanoic acid were treated as in Example a except for the following modifications. After the reaction was complete the ppt was filtered off and washed with cold H$_2$O. The crystals were then dissolved in 20 ml of 2 N HCl. The pH was adjusted to 8.0 by the addition of 2 N NH$_4$OH. After standing at 5° overnight, the white crystals were filtered off and washed with cold H$_2$O, EtOH, and Et$_2$O: yield, 68 percent; mp, 274°–275°, Anal. ($C_7H_{15}N_3O_2$·HCl) C, H, N, Cl. Ir peaks (cm$^{-1}$) were 615, 658, 690, 742, 818, 845, 911, 977, 1013, 1081, 1150.

The compositions of this invention thus constitute significant new antimicrobials. It is contemplated that they will be taken during periods where contact with staphylococci, streptococci or Salmonella typhi infections are likely, such as on entering and during a hospital exposure to the infection. The acid can be taken orally in 250 to 500 mg. tablets or as injections of, say, 150 to 500 mg. The guanidino acid per se or the acid combined with an aqueous, vegetable oil, monoglyceride or diglyceride vehicle for injection can be administered, sodium chloride being used if necessary to render the solution isotonic. The solution will contain 0.1 to 1.5 percent by weight, of the guanidino acid.

In the case of tablets, the guanidino acid can be combined with suitable colorants, adhesives, and lubricants, along with a solid pharmaceutical diluent, for instance, starches, lactose, sucrose and other pharmaceutical diluents. These tablets will contain 0.08 percent to 5 weight percent of the guanidino acid, preferably 0.08 percent to 1.3 weight percent. Capsules can also be made.

A process is thus provided for the control of infections in humans and other mammals due to cocci and bacilli, which involves administering to the mammal suffering from the infection an effective amount of the guanidino acid. In addition variations and modifications will occur to those skilled in the art. Such ramifications are deemed to be within the scope of this invention.

What is claimed is:

1. A method of treating bacterial infections in mammals comprising administering to a mammal suffering from said bacterial infection an antibacterially effective amount of an omega-guanidino acid having the formula H$_2$N—C(=NH)—NH—(CH$_2$)$_n$—COOH where $n$ is a whole number of 1 to 5.

2. The method of claim 1 wherein $n$ is 1, the acid being guanidinoacetic acid.

3. The method of claim 1 where $n$ is 2, the acid being beta-guanidinopropionic acid.

4. The method of claim 1 where $n$ is 3, the acid being gamma-guanidinobutyric acid.

5. The method of claim 1 where $n$ is 4, the acid being delta-guanidinovaleric acid.

6. The method of claim 1 where $n$ is 5, the acid being epsilon-guanidinohexanoic acid.

* * * * *